Figure 1:
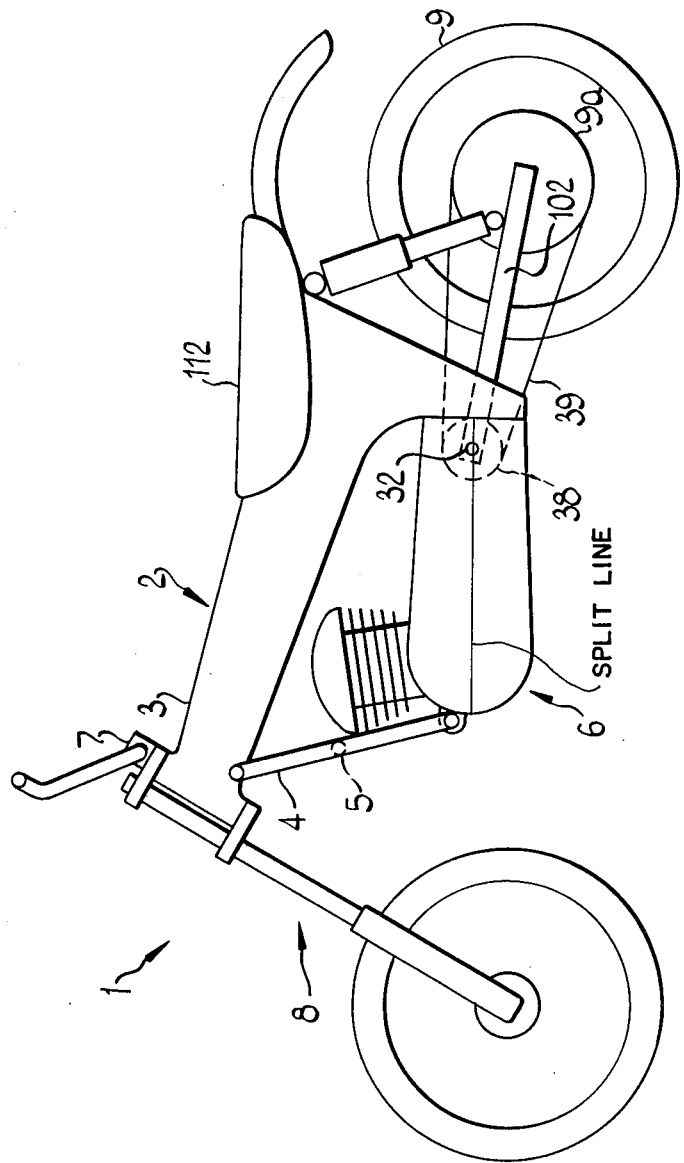

United States Patent [19]

Silk et al.

[11] 4,265,330
[45] May 5, 1981

[54] MOTORCYCLE GEAR BOX AND REAR WHEEL SUSPENSION SYSTEM

[76] Inventors: George R. Silk, 61 Netherfield Rd.; David Midgelow, 12 Hadstock Close, both of Sandiacre, Nottinghamshire, England

[21] Appl. No.: 38,706

[22] Filed: May 14, 1979

[30] Foreign Application Priority Data

May 19, 1978 [GB] United Kingdom ............... 20636/78

[51] Int. Cl.³ .......................... B60K 5/12; B62K 11/08
[52] U.S. Cl. .................................... 180/230; 180/227; 280/284
[58] Field of Search .................. 180/227 X, 230, 219, 180/226, 231; 280/281 R, 281 B, 284 X, 283; 74/357

[56] References Cited

U.S. PATENT DOCUMENTS

| 1,296,216 | 3/1919 | Reif | 180/262 |
|---|---|---|---|
| 2,755,873 | 7/1956 | Klaue | 180/227 |
| 3,722,612 | 3/1973 | Issigonis et al. | 280/283 |
| 3,974,892 | 8/1976 | Bolger | 180/227 |
| 4,091,887 | 5/1978 | Kurata et al. | 180/230 |
| 4,139,072 | 2/1979 | Dawson | 280/281 R |
| 4,165,728 | 8/1979 | Matsumoto et al. | 180/219 |

FOREIGN PATENT DOCUMENTS

| 558387 | 1/1944 | United Kingdom . |
|---|---|---|
| 735618 | 8/1955 | United Kingdom . |
| 825977 | 12/1959 | United Kingdom . |
| 1313759 | 4/1973 | United Kingdom . |
| 1477479 | 6/1977 | United Kingdom . |

Primary Examiner—Randolph A. Reese
Assistant Examiner—Donn McGiehan
Attorney, Agent, or Firm—Cushman, Darby & Cushman

[57] ABSTRACT

A motor cycle which is suitable both for use as a trail machine and as road bike has an engine and gear box assembly which forms an integral part of the monocoque frame of the motor cycle. The gear box has an input shaft, an intermediate shaft and an output shaft and a chain driving sprocket mounted on the output shaft. The rear wheel of the motor cycle is mounted in a swing arm, the pivot axis of which is coincident with the axis of the gear box output shaft and the rear wheel is driven by a chain passing over the sprocket on the output shaft and a sprocket attached to the rear. Since the swing arm axis and output shaft axis are coincident, the swing arm and rear wheel are able to accommodate large suspension movements without affecting the chain tension because of these movements.

7 Claims, 4 Drawing Figures

MOTORCYCLE GEAR BOX AND REAR WHEEL SUSPENSION SYSTEM

This invention relates to motor cycles and is more particularly concerned with motor cycle gear boxes and the relationship between the axis of the gearbox final drive and the axis of the swing arm in which the rear wheel of the motor cycle is mounted.

The requirements for a motor cycle to be used as a road vehicle and one to be used as a trail machine are generally considered to be mutually exclusive in several important technical respects. For example, a requirement of a modern trail machine is that it should have a long suspension movement, however, such long movements tend to cause large variations in chain tension. The present invention seeks to provide a means whereby the final drive chain tension can be maintained substantially constant.

A trail machine must also be able to trickle through tight and twisty sections, the engine providing high rear wheel torque and rapid throttle response for which a gear box having at least four low fairly close and useable ratios is required. The trail machine must also be able to move rapidly along the straight sections and similarly a road machine must have a reasonable road speed. For ordinary road use, a flexible high torque low rotational speed engine is required and this conflicts with the requirements for a trail machine. The present invention also seeks to provide a motor cycle gear-box which has an adequate number of gears to suit both trails and road use and which also has a narrow machine profile.

According to one aspect of the present invention there is provided a motor cycle having a gear box with at least an input shaft and an output shaft, a drive from the output shaft of the gearbox to a driven road wheel, the driven wheel being mounted in a swing arm, the pivot axis of the swing arm being coincident with the axis of rotation of the output shaft.

According to a further aspect of the present invention, the gear box comprises an input shaft, an intermediate shaft and an output shaft, the input shaft and the intermediate shaft having an equal number of gear wheels, some of the wheels on the input shaft being freely rotatable thereon and being rotatable with the input shaft by first engaging means, the gear wheels on the intermediate shaft all being freely rotatable thereon and being in constant mesh with corresponding gear wheels on the input shaft, the output shaft having at least two gear-wheels freely rotatable thereon and in constant mesh with corresponding gearwheels on the intermediate shaft, the gear-wheels on the output shaft being selectively rotatable with the output shaft by second engaging means.

Figure 2:
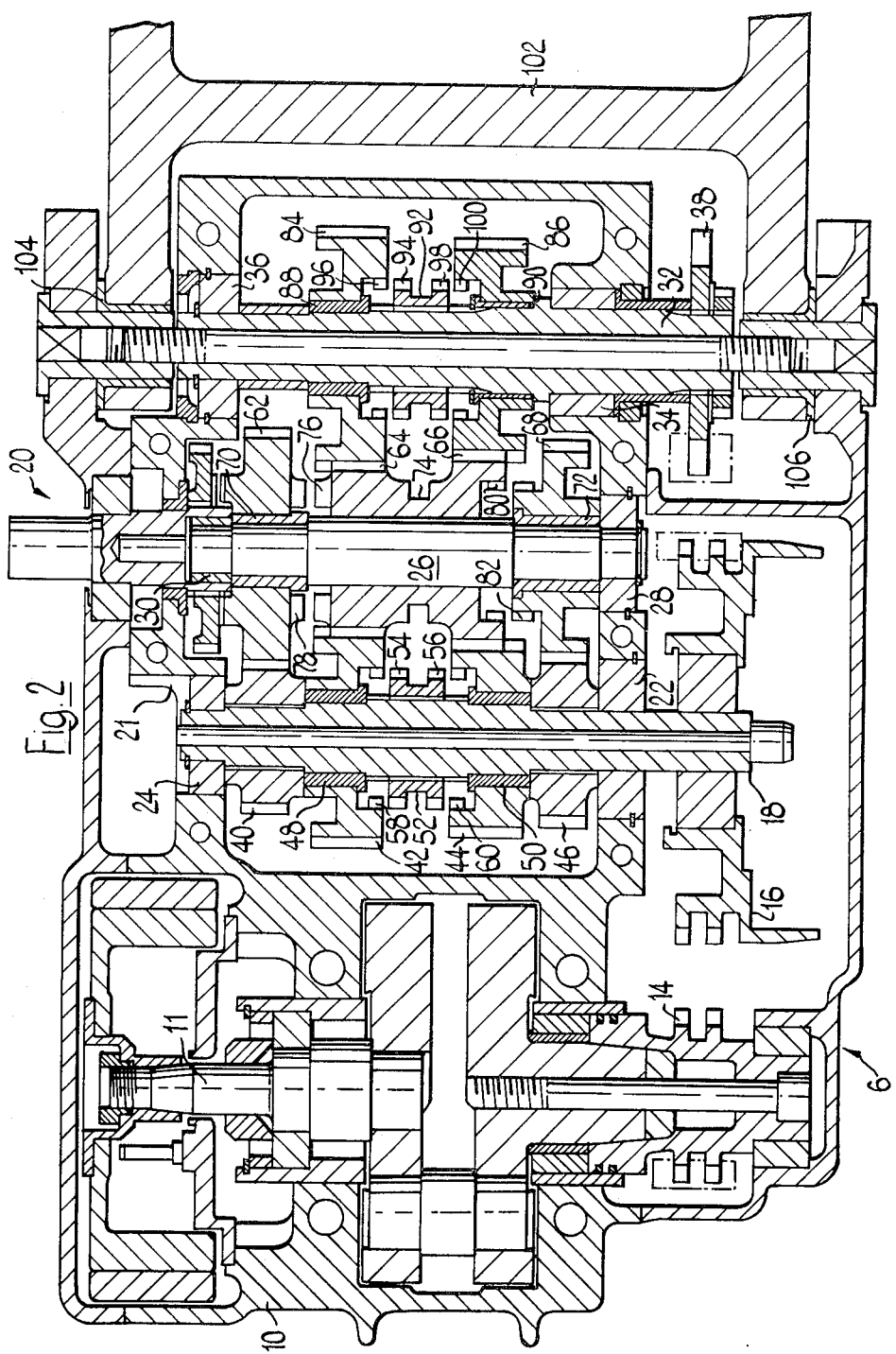
Figure 3:
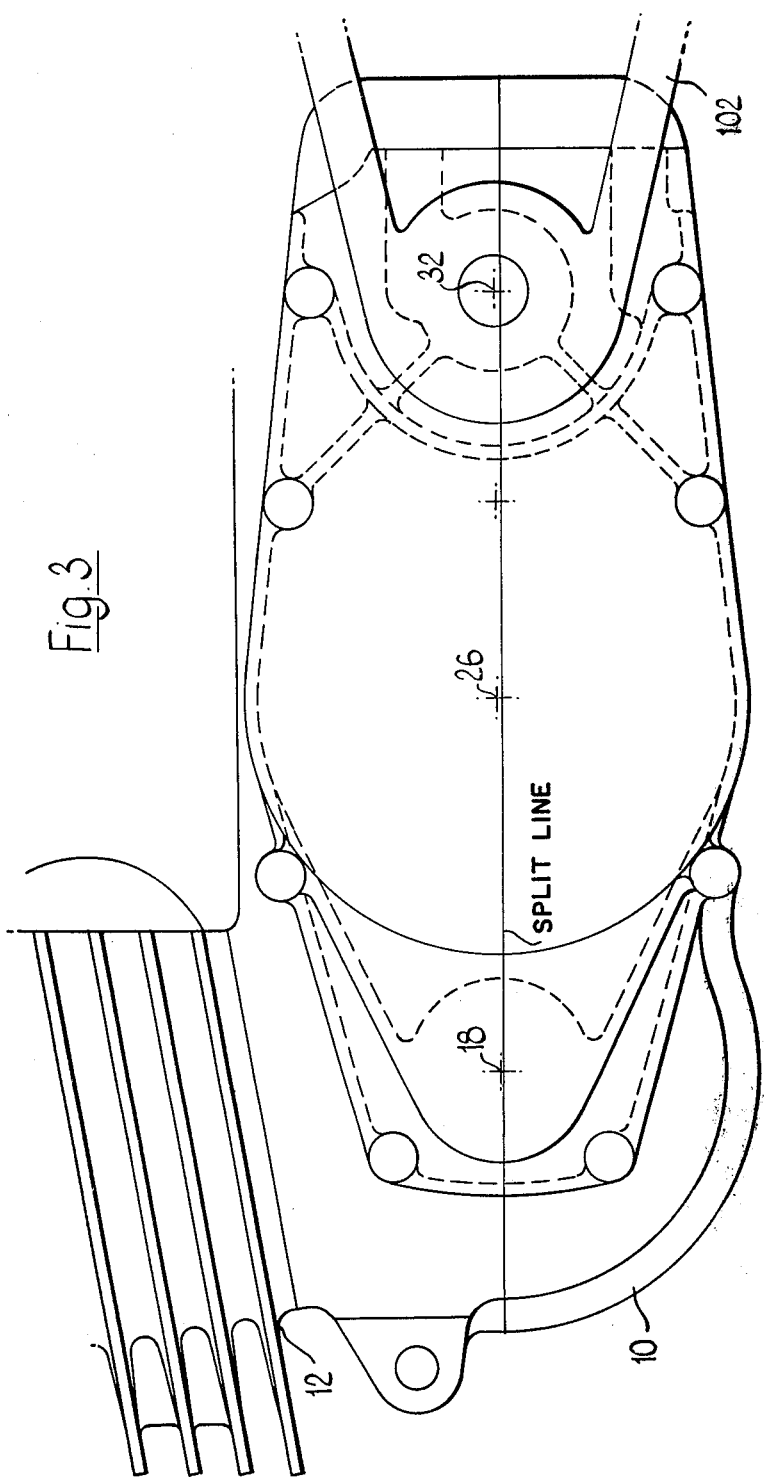
Figure 4:
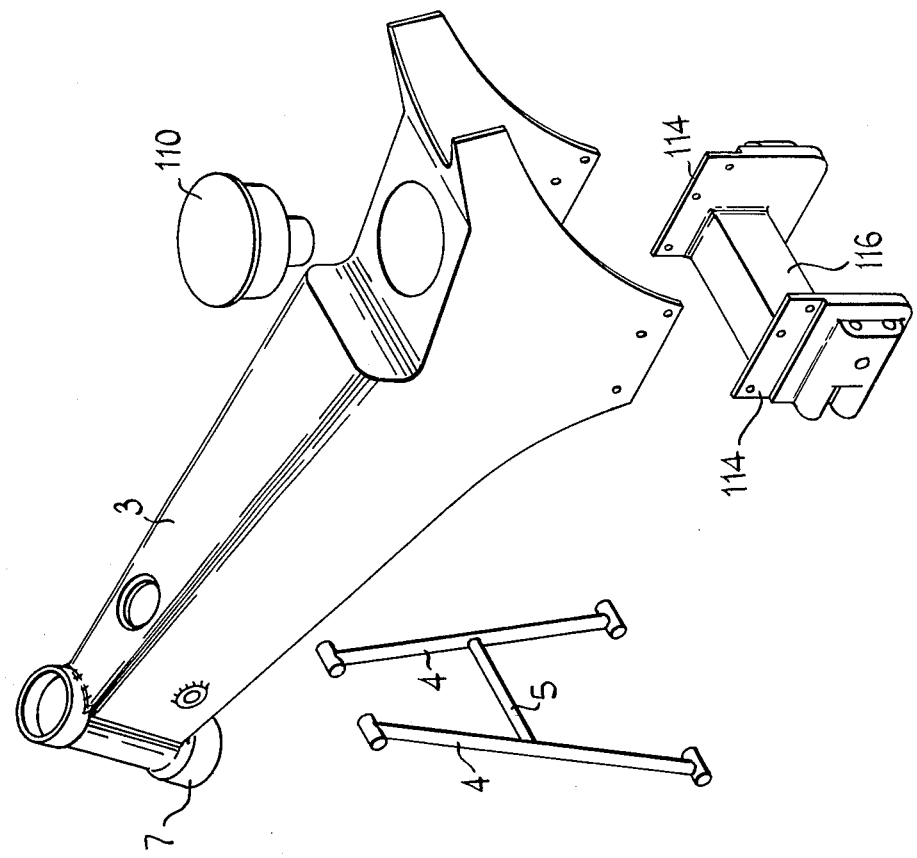

The present invention will now be more particularly described with reference to the accompanying drawings in which:

FIG. 1 shows a diagramatic side elevation of a motor cycle incorporating one form of gear box and swing arm according to the present invention, FIG. 2 shows a partial plan view of the gear box and swing arm shown in FIG. 1 in greater detail, FIG. 3 is a partial side elevation of the gear box and swing arm shown in FIGS. 1 and 2, and FIG. 4 is an exploded perspective view of the frame of the motor cycle shown in FIG. 1

Referring first to FIG. 1 of the drawing, a motor cycle 1 comprises a monocoque frame 2 which consists of a top frame member 3, two front down tubes 4 connected together by a cross-bar 5 and an engine and gear box assembly 6 which form an integral part of the frame 1. The top frame member 3 is a generally U-shaped pressing which is boxed in at the bottom and incorporates a steering head 7 for a conventional handle bar, front forks and wheel assembly 8. The rear wheel 9 is supported in a swing arm which will be described in more detail later and the swing arm is also attached to the frame 2 by two shock absorbers.

Referring more particularly to FIGS. 2 and 3 the engine and gearbox assembly 6 and swing arm comprise a horizontally split casing 10 in which a crankshaft 11 is mounted and is driven by a connecting rod and piston (not shown) which is movable in a cylinder 12 (FIG. 2) The crankshaft 11 has a drive sprocket 14 which drives by means of a primary chain (not shown) and a clutch (not shown) a sprocket 16 secured to an input shaft 18 of a gearbox 20.

The gearbox 20 comprises a split casing 21 integral with casing 10, the input shaft 18 mounted in bearings 22, 24 an intermediate shaft 26 mounted in bearings 28, 30 and an output shaft 32 mounted in bearings 34, 36, the output shaft being provided with a chain sprocket 38. A chain 39 mounted on the sprocket 38 drives the rear wheel 9 of the motor cycle 1 via a sprocket 9a.

The input shaft 18 carries four gear wheels 40, 42, 44 and 46, the gear wheels 40 and 46 being splined to the shaft 18 and the gear wheels 42 and 44 being rotatable with respect to the shaft 18 on bearings 48 and 50 respectively. Also mounted on the shaft is a selector 52 which is splined to the shaft 18 and is axially movable thereon by means of a selector fork (not shown). The selector has dogs 54 and 56 which engage with corresponding dogs 58 and 60 on the gear wheels 42 and 44 respectively.

The gear wheels 40, 42, 44 and 46 are constantly in mesh with gear wheels 62, 64, 66 and 68 respectively which are mounted for rotation on the intermediate shaft 26. The gears 62 and 68 are mounted on bearings 70 and 72 respectively and the gear wheels 64, 66 are integral with a sleeve 74 which is axially movable on the shaft 26 by means of another selector fork (not shown).

The sleeve 74 has dogs 76 which are engageable with dogs 78 on the gear wheel 62 and dogs 80 which are engageable with dogs 82 on the gear wheel 68.

The gear wheels 64 and 66 are constantly in mesh with gear wheels 84 and 86 respectively which are rotatable in corresponding bearings 88 and 90 on the output shaft 32.

A selector 92 is axially movable on splines on the shaft 32 by means of a further selector fork (not shown) and has dogs 94 which engage with corresponding dogs 96 on the gear wheel 84 and dogs 98 which engage with corresponding dogs 100 on the gear wheel 86.

Both of the selectors 52, 92 and the sleeve 74 can be operated by means (not shown) which are well known and established, such as a suitable arranged system of selector forks, levers, cranks and push rods which can either be hand or foot operated, although the latter method is preferable.

For example, the selector forks which operate the selectors 52 and 74 can be coupled together so that they can be operated by a common foot operated gear change lever and the selector fork which operates the selector 92 can be operated by a further foot operated gear change lever.

It will be seen that sleeve 74 enables two different ranges of four speed ratios to be engaged in the gearbox. With the sleeve operated so that dogs 76 and 78 engage the drive between the input and output shafts can be as follows: The selector 52 is operated to engage dogs 54, 58 and the selector 92 is operated to engage either the dogs 94, 96 or dogs 98, 100. Also the selector 52 can be operated to engage dogs 56, 60 and the selector 92 is operated in the same way again to either lock the gear wheel 84 or the gear wheel 86 to the output shaft. These combinations of the positions of the selectors is repeated with the sleeve positioned so that the dogs 80 and 82 are engaged. Thus eight gear ratios are obtained in two sets of four ratios each as follows:

The sleeve 74 engages gear wheel 62 via dogs 76, 78 and the drive is from input to output shafts 18 and 32 respectively via gear wheels 40, 62, 64 and 34 with dogs 94, 96 engaged or 40, 62, 64 and 86 with dogs 98, 100 engaged or 42, with dogs 54, 58 engaged and 84 with dogs 94, 96 engaged or 42 with dogs 54, 58 engaged 64 and 86 with dogs 98, 100 engaged and with the sleeve engaging gear wheel 68 via dogs 80, 82 the drive is via 44 with dogs 56, 60 engaging 66 and 84 with dogs 94, 96 engaging or 44 with dogs 56, 60 engaging 66 and 86 with dogs 98, 100 engaging or 46, 68, 66 and 84 with dogs 94, 96 engaged or 46, 68, 66 and 86 with dogs 98, 100 engaged.

The gear box thus gives a range of eight gear ratios which will be suitable for both trails and ordinary road use, A swing arm 102 is mounted on bearings 104, 106 co-axially with the output shaft 32 of the gear-box 20 and the rear wheel 9 of the motor-cycle 1 is mounted in the swing arm. Because the centre of rotation of the swing arm 102 is coincident with the axis of rotation of the output shaft 32, the tension in the chain (FIG. 1) which drives the rear wheel 9 from the sprocket 38 will not vary whatever the rotational position of the swing arm may be relative to the remainder of the motor cycle. This means that the long rear wheel suspension travel which is essential for a trails use in now possible with out causing variations in chain tension.

The output shaft 32 has been shown with two output gears but the output shaft need only be a single speed shaft in order for the swing arm pivot point to be mounted concentrically with the shaft, although the number of gear ratios available will be reduced correspondingly.

The provision of a gear box with three shafts enables the swing arm to be pivotably mounted concentrically with the centre-line of the output shaft as compared to the conventional motor cycle with a two shaft gear box in which the swing arm pivot point is located rearwardly of the output shaft centre-line. With this latter arrangement, the chain tension varies from a minimum at the extremeties of travel of the swing arm from a centre position to a maximum at the centre position, i.e. when the centre of the rear wheel is aligned with the swing arm pivot point and the output shaft. This means also that the moment arm between the rear wheel centre and the swing arm pivot varies with the position of the swing arm. In the arrangement according to the invention this moment arm does not vary with the position of the swing arm.

FIG. 4 shows more clearly the construction of the monocoque frame 2, the top frame member 3 and the front down tubes 4, cross-bar 5 and cast aluminium steering head 7. The top frame member 3 incorporates the petrol tank and an air filter 110 located under the seat 112. The engine and gear-box assembly 6 is bolted at the front end to the lower end of the front down tubes 4 and at the rear end to two lower frame side-plates 114 which are attached together by a box section 116, the box section acting as a container for chain lubricating oil.

The side-plates 114 are bolted to the frame member 3 as are two rear mountings 118 to which the two shock absorbers are attached.

Thus, the engine and gear box assembly 6, the frame member 3 and the down tubes 4 form an integral part of the monocoque frame of the motor cycle.

What we claim is:

1. A motorcycle comprising:
a frame structure;
an engine;
a front wheel and a rear driven road wheel, each operatively supported by said frame structure;
a change speed gear box for transmitting power from said engine to said driven road wheel at a predetermined number of gear ratios, said change speed gear box having an input shaft operatively driven by said engine, an intermediate shaft, and an output shaft, said input shaft having a plurality of gears thereon, said intermediate shaft having a plurality of gears thereon and said output shaft having a plurality of gears thereon;
means for selectively engaging and disengaging gears on adjacent ones of said input shaft, said intermediate shaft and said output shaft to transmit power from said input shaft to said output shaft through the intermediate shaft at any of the predetermined number of gear ratios, said means including a first engaging and disengaging means between said input shaft and said intermediate shaft and a second engaging and disengaging means between said intermediate shaft and said output shaft;
a swing arm on which said driven road wheel is mounted, said swing arm having a pivot axis coincident with an axis of rotation of said output shaft; and
drive means coupling said output shaft to said driven road wheel.

2. A motorcycle as claimed in claim 1 in which said gears on said input shaft are equal in number to said gears on said intermediate shaft, at least some of said gears on said input shaft being freely rotatable thereon and being selectively rotatable with said input shaft by said first engaging and disengaging means, said gears on said intermediate shaft all being freely rotatable thereon and being in constant mesh with corresponding ones of said gears on said input shaft, at least one of said gears on said output shaft being freely rotatable thereon and in constant mesh with a corresponding one of said gears on said intermediate shaft, said at least one gear on said output shaft being selectively rotatable with said output shaft by said second engaging and disengaging means.

3. A motorcycle as claimed in claim 2 in which at least two of said gears on said output shaft are freely rotatable thereon and in constant mesh with corresponding ones of said gears on said intermediate shaft, said freely rotatable gears on said output shaft being selectively rotatable with said output shaft by said second engaging and disengaging means.

4. A motorcycle as claimed in claim 1 including a frame element, and in which said frame element, said engine and said change speed gear box in combination form said frame structure, and said frame structure being monocoque.

5. A motorcycle as claimed in claim 1 including a top frame element secured to said engine and said change speed gear box at the rear end of said change speed gear box, and a downtube assembly secured to said top frame element at its front end thereof, and secured to said engine and said change speed gear box at the front end of said engine.

6. A motorcycle as claimed in claim 1 including a crankcase for said engine, and a casing having two parts and containing said crankcase and said change speed gear box, said parts of said casing being connected together in a horizontal plane.

7. A motorcycle comprising:
- a frame structure;
- an engine;
- a front wheel and a rear driven road wheel, each operatively supported by said frame structure;
- a change speed gear box for transmitting power from said engine to said driven road wheel at a predetermined number of gear ratios, said change speed gear box having an input shaft operatively driven by said engine, an intermediate shaft, and an output shaft, said input shaft having four gears thereon, said intermediate shaft having four gears thereon and said output shaft having two gears thereon;
- means for selectively engaging and disengaging gears on adjacent ones of said input shaft, said intermediate shaft and said output shaft to transmit power from said input shaft to said output shaft through the intermediate shaft at any of the predetermined number of gear ratios, said means including a first engaging and disengaging means between said input shaft and said intermediate shaft and a second engaging and disengaging means between said intermediate shaft and said output shaft;
- two gears of said four gears on said input shaft being freely rotatable thereon and selectively rotatable therewith by said first engaging and disengaging means;
- two remaining gears of said four gears on said input shaft being secured to said input shaft for rotation therewith;
- said four gears on said intermediate shaft all being freely rotatable thereon and in constant mesh with respective ones of said four gears on said input shaft, two of said four gears on said intermediate shaft being coupled together for rotation with each other and being in constant mesh with said two freely rotatable gears on said input shaft;
- said two gears on said output shaft being freely rotatable on said output shaft and selectively rotatable therewith by said second engaging and disengaging means, said two gears on said output shaft being in constant mesh with respective ones of said two rotatably coupled together gears on said intermediate shaft;
- said means for selectively engaging and disengaging gears including a third engaging and disengaging means for selectively engaging said two rotatably coupled together gears on said intermediate shaft with either one of the other two gears on said intermediate shaft;
- a swing arm on which said driven road wheel is mounted, said swing arm having a pivot axis coincident with an axis of rotation of said output shaft; and
- drive means coupling said output shaft to said driven road wheel.

* * * * *